(12) United States Patent
Ter Beest (10) Patent No.: US 11,879,984 B2
(45) Date of Patent: Jan. 23, 2024

(54) SYSTEMS AND METHODS FOR DETERMINING A POSITION OF A SENSOR DEVICE RELATIVE TO AN OBJECT

(71) Applicant: Booz Allen Hamilton Inc., McLean, VA (US)

(72) Inventor: James J. Ter Beest, McLean, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 440 days.

(21) Appl. No.: 17/326,810

(22) Filed: May 21, 2021

(65) Prior Publication Data

US 2022/0373697 A1    Nov. 24, 2022

(51) Int. Cl.
*G01S 19/48* (2010.01)
*G01S 19/37* (2010.01)

(52) U.S. Cl.
CPC ............ *G01S 19/485* (2020.05); *G01S 19/37* (2013.01)

(58) Field of Classification Search
CPC .... G01S 19/485; G01S 19/37; G01S 2205/03; G01S 5/16; G01S 5/163; G06T 7/251; G06T 7/75; G06T 2207/10016; G06T 2207/10024; G06T 2207/10032; G06T 2207/20081; G06T 2207/30212
See application file for complete search history.

(56) References Cited

U.S. PATENT DOCUMENTS

| | | | |
|---|---|---|---|
| 10,262,437 B1 * | 4/2019 | Ter Beest, III | G06T 7/74 |
| 10,969,237 B1 * | 4/2021 | Zhang | G06F 18/24 |
| 2006/0088203 A1 * | 4/2006 | Boca | G06T 7/80 |
| | | | 382/153 |
| 2015/0347846 A1 * | 12/2015 | Guzmán-Rivera | G06V 10/774 |
| | | | 382/103 |
| 2017/0256068 A1 * | 9/2017 | Wang | G06T 7/337 |
| 2019/0014760 A1 * | 1/2019 | Twining | B64C 39/024 |
| 2019/0096081 A1 * | 3/2019 | Gupta | G06T 5/00 |
| 2019/0108651 A1 * | 4/2019 | Gu | G06T 7/80 |
| 2019/0130216 A1 * | 5/2019 | Tomioka | G06F 18/214 |
| 2019/0130603 A1 * | 5/2019 | Sun | G06N 3/045 |
| 2019/0204093 A1 * | 7/2019 | Cantrell | B64C 39/024 |
| 2020/0257904 A1 * | 8/2020 | Sebastian | G06N 20/00 |
| 2020/0304707 A1 * | 9/2020 | Williams | H04N 23/61 |
| 2021/0118166 A1 * | 4/2021 | Tremblay | B25J 9/1697 |
| 2021/0192764 A1 * | 6/2021 | Liu | G06V 20/13 |

(Continued)

*Primary Examiner* — Xuemei G Chen
(74) *Attorney, Agent, or Firm* — BUCHANAN INGERSOLL & ROONEY PC (57) ABSTRACT

A method and system to determine the position of a moveable platform relative to an object is disclosed. The method can include storing one or more synthetic models each trained by one of the one or more synthetic model datasets corresponding to one or more objects in a database; capturing an image of the object by one or more sensors associated with the moveable platform; identifying the object by comparing the captured image of the object to the one or more synthetic model datasets; generating a first model output using a first synthetic model of the one or more synthetic models, the first model output including a first relative coordinate position and a first spatial orientation of the moveable platform; and generating a platform coordinate output and a platform spatial orientation output of the moveable platform at the first position based on the first model output.

32 Claims, 8 Drawing Sheets

(56) References Cited

U.S. PATENT DOCUMENTS

| | | | |
|---|---|---|---|
| 2021/0368094 A1* | 11/2021 | Li | G06N 20/00 |
| 2022/0011579 A1* | 1/2022 | Wang | G06T 7/70 |
| 2022/0156967 A1* | 5/2022 | Korjus | G01S 13/867 |
| 2022/0277480 A1* | 9/2022 | Tokuhiro | G01C 21/30 |
| 2023/0230275 A1* | 7/2023 | Lin | G06T 7/70 |
| | | | 382/103 |

* cited by examiner

SYSTEMS AND METHODS FOR DETERMINING A POSITION OF A SENSOR DEVICE RELATIVE TO AN OBJECT

FIELD

Aspects of the present disclosure provide systems and methods for determining a position and spatial orientation of a moveable platform relative to an object, and more particularly, to using computer vision and trained machine learning models to determine a coordinate position and a spatial orientation of a moveable platform having one or more sensors relative to an object.

BACKGROUND INFORMATION

Known positioning devices determine position and navigation by leveraging Global Navigation Satellite Systems (GNSS) such as the United States' Global Positioning System (GPS) and terrestrial navigational aids such as Assisted-GPS (A-GPS) and Wi-Fi Positioning Systems. A-GPS and Wi-Fi Positioning support metropolitan-area position determination by listening for nearby static signals such as Commercial Cellular or IEEE 802.11 (Wi-Fi) to either triangulate whereabouts to a rough approximation or determine nearby proximity to a low power signal via metadata database search.

When approximate coordinates are determined, a hot-start GNSS fix can be obtained to determine a more exact absolute geographic coordinate position. GNSS measurements, however, lack accuracy to provide precision measurements for certain applications, especially for applications reliant on accurate altitude information. A GNSS receiver's real-time received signals from orbiting satellites may also be victim to data integrity or disruption from natural or manmade phenomena interfering with signal integrity or reception under certain conditions or positions.

Currently, there are no reliably precise, automated positioning devices that determine an object's relative distance to that of its sensor or sensors through use of cameras and graphics processor units (GPUs). Aspects of the present disclosure provide systems and methods to determine a position of a sensor device more precisely relative to an object.

SUMMARY

A method for determining the position of a moveable platform relative to an object is disclosed. The method can include storing, in a database, one or more synthetic model datasets and one or more synthetic models each trained by one of the one or more synthetic model datasets, each of the one or more synthetic model datasets and synthetic models corresponding to one or more objects; capturing an image of the object by one or more sensors using computer vision object detection, wherein the one or more sensors are associated with the moveable platform; identifying the object by comparing the captured image of the object to the one or more synthetic model datasets; identifying a synthetic model dataset corresponding to the object, and one or more synthetic models corresponding to the object, the one or more synthetic models corresponding to the object being trained by the synthetic model dataset corresponding to the object; generating a first model output using a first synthetic model of the one or more synthetic models corresponding to the object based on a first position of the moveable platform relative to the object, the first model output including a first relative coordinate position and a first spatial orientation of the moveable platform; and generating a platform coordinate output of the first position of the moveable platform and a platform spatial orientation output of the moveable platform at the first position, the platform coordinate output and the spatial orientation output being based on the first model output.

A system for determining the position of a moveable platform relative to an object is disclosed. The system can include a database configured to store one or more synthetic model datasets and one or more synthetic models each trained by one of the one or more synthetic model datasets, each of the one or more synthetic model datasets and synthetic models corresponding to one or more objects. The moveable platform of the system including one or more sensors associated to the moveable platform, the one or more sensors configured to capture an image of the object by one or more sensors using computer vision object detection, wherein at least the one or more sensors are associated with the moveable platform. A processor of the system configured to identify the object by comparing the captured image of the object to the one or more synthetic model datasets; identify a synthetic model dataset corresponding to the object, and one or more synthetic models corresponding to the object, the one or more synthetic models corresponding to the object being trained by the synthetic model dataset corresponding to the object; generate a first model output using a first synthetic model of the one or more synthetic models corresponding to the object based on a first position of the moveable platform relative to the object, the first model output including a first relative coordinate position and a first spatial orientation of the moveable platform; and generate a platform coordinate output of the first position of the moveable platform and a platform spatial orientation output of the moveable platform at the first position, the platform coordinate output and the spatial orientation output being based on the first model output.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

Further areas of applicability of the present disclosure will become apparent from the following detailed description. It should be understood that the detailed descriptions of exemplary embodiments are intended for illustration purposes only and are not intended to limit the scope of the disclosure.

DETAILED DESCRIPTION

The present disclosure provides novel methods and systems for determining a position of a sensor device relative to an object. Currently, there are no devices that can automatically determine the device's coordinate position and spatial orientation relative to an object. The methods and systems herein provide a novel solution that provides the capability of leveraging one or more sensors directly or indirectly associated with a device (e.g., a moveable platform) to detect an object and then determine the device's coordinate position and spatial orientation relative to the detected object. Exemplary embodiments of the methods and systems provided herein utilize synthetic model datasets made up of synthetic images of objects to train one or more synthetic models for detecting and identifying an object. Exemplary embodiments of the methods and systems provided herein may then utilize the trained synthetic models to determine a relative coordinate position and spatial orientation of a device based on an image of an object within viewing range of the device. For example, but not limited to, a drone equipped with one or more sensors (e.g., cameras, etc.) tasked with tracking a military fighter jet may detect the jet using the one or more sensors and capture an image of the jet to input into the one or more trained synthetic models trained with synthetic images of the jet to determine the relative coordinate position and spatial orientation of the drone relative to the position and orientation of the jet. Another example is an auto-pilot routine on an aircraft leveraging methods and systems provided herein to perform enhanced ranging on objects of interest (e.g., refueling with probe and drogue systems). Further, exemplary embodiments of the methods and systems provided herein enable a device to continuously or over time detect or track an object in motion and continuously or over time update the device's coordinate position and spatial orientation relative to the moving object. Thus, the methods and systems provided herein provide a novel solution for more precisely determining a position of a sensor device relative to an object.

Figure 1A:
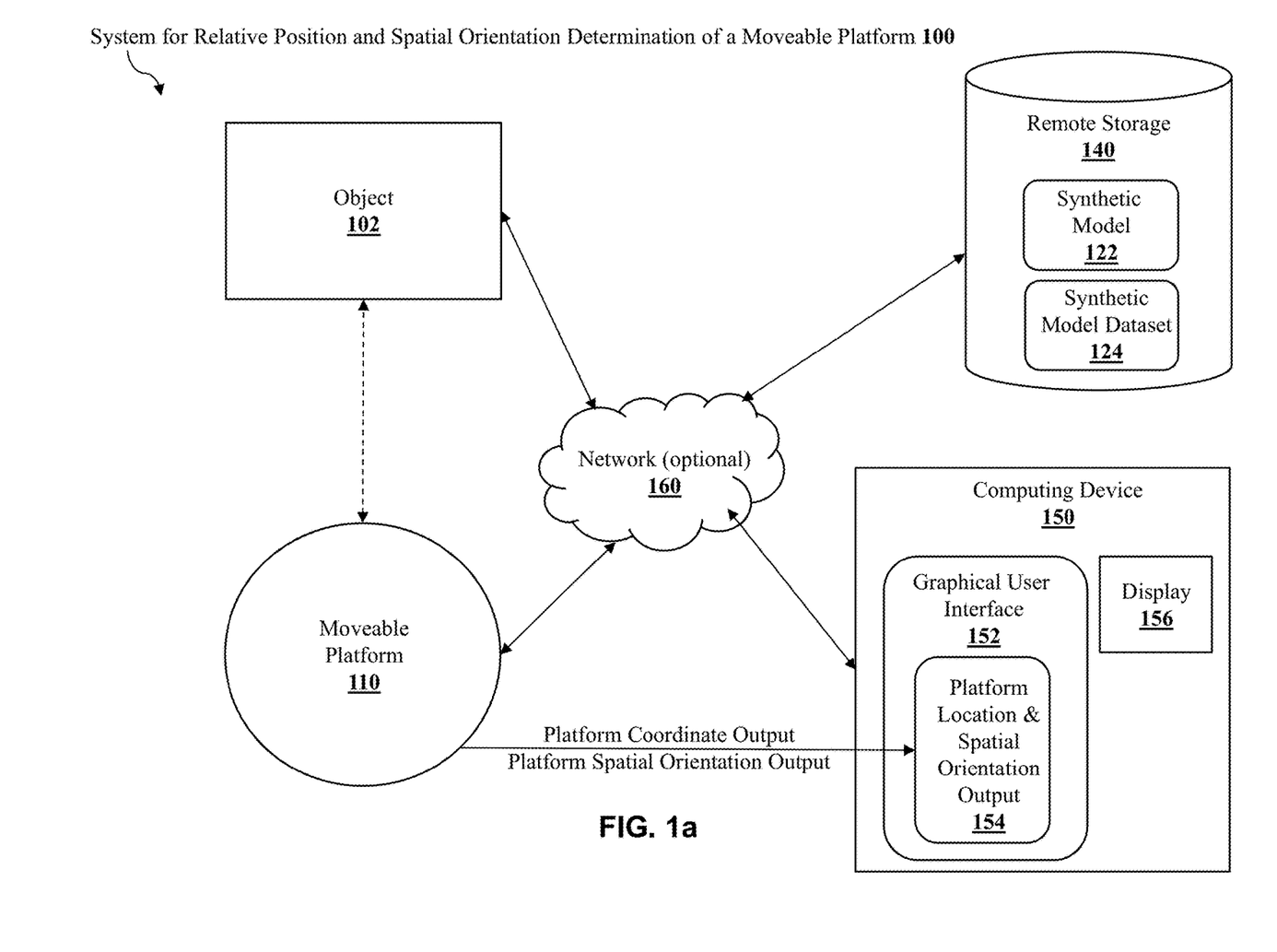
FIG. 1a illustrates a system for determining the position of a moveable platform relative to an object in accordance with exemplary embodiments.

System for Determining Position and Spatial Orientation of a Moveable Platform Relative to an Object FIG. 1a illustrates an exemplary system 100 for determining a position of a moveable platform relative to an object in accordance with exemplary embodiments. The system 100 includes an object 102, a moveable platform 110, a remote storage 140, a computing device 150, and an optional network 160.

Figure 2:
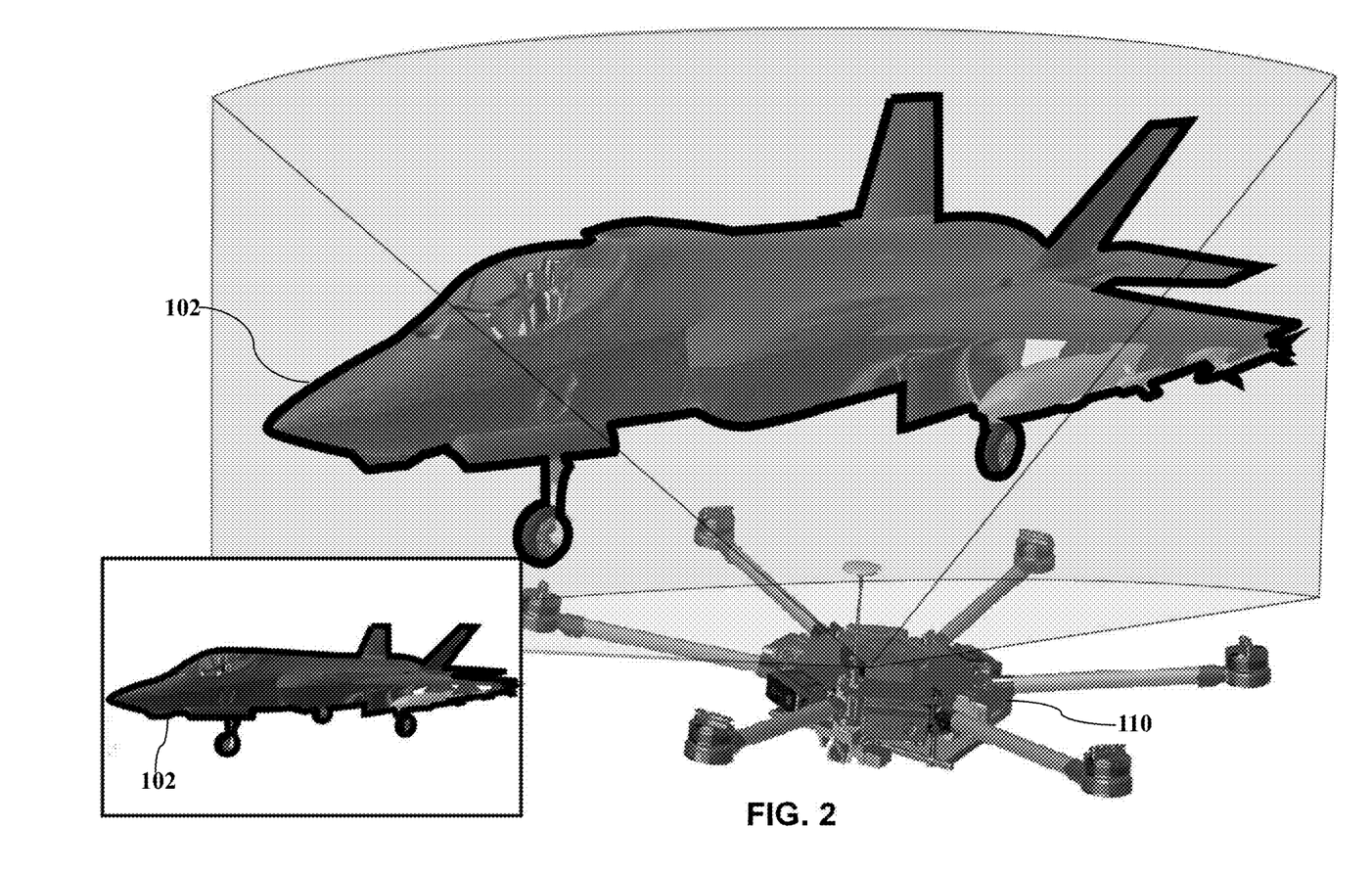
FIG. 2 illustrates object detection by the moveable platform illustrated in FIGS. 1a-b in accordance with exemplary embodiments.
Figure 3:
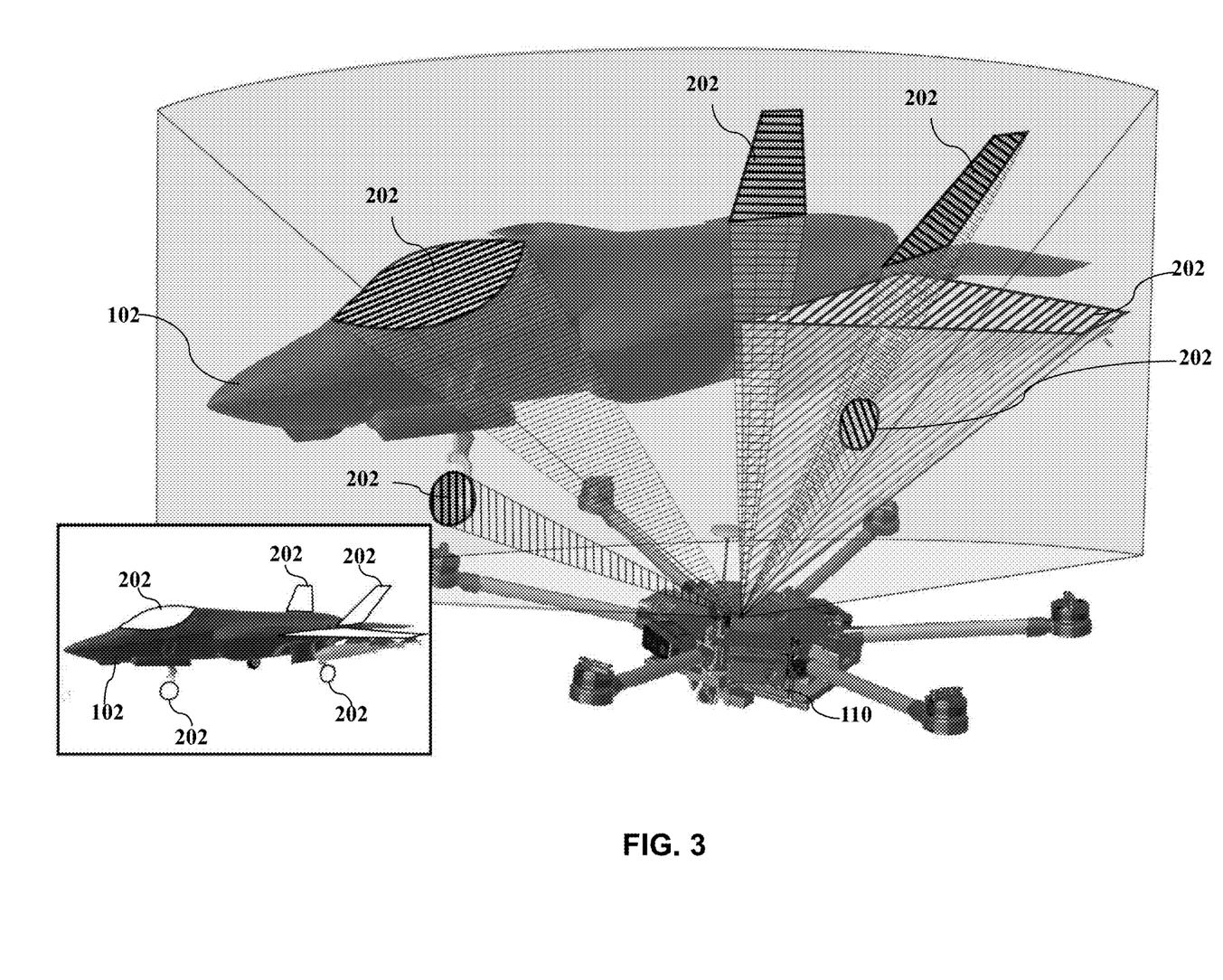
FIG. 3 illustrates object subcomponent detection by a moveable platform illustrated in FIGS. 1a-b in accordance with exemplary embodiments.
Figure 4:
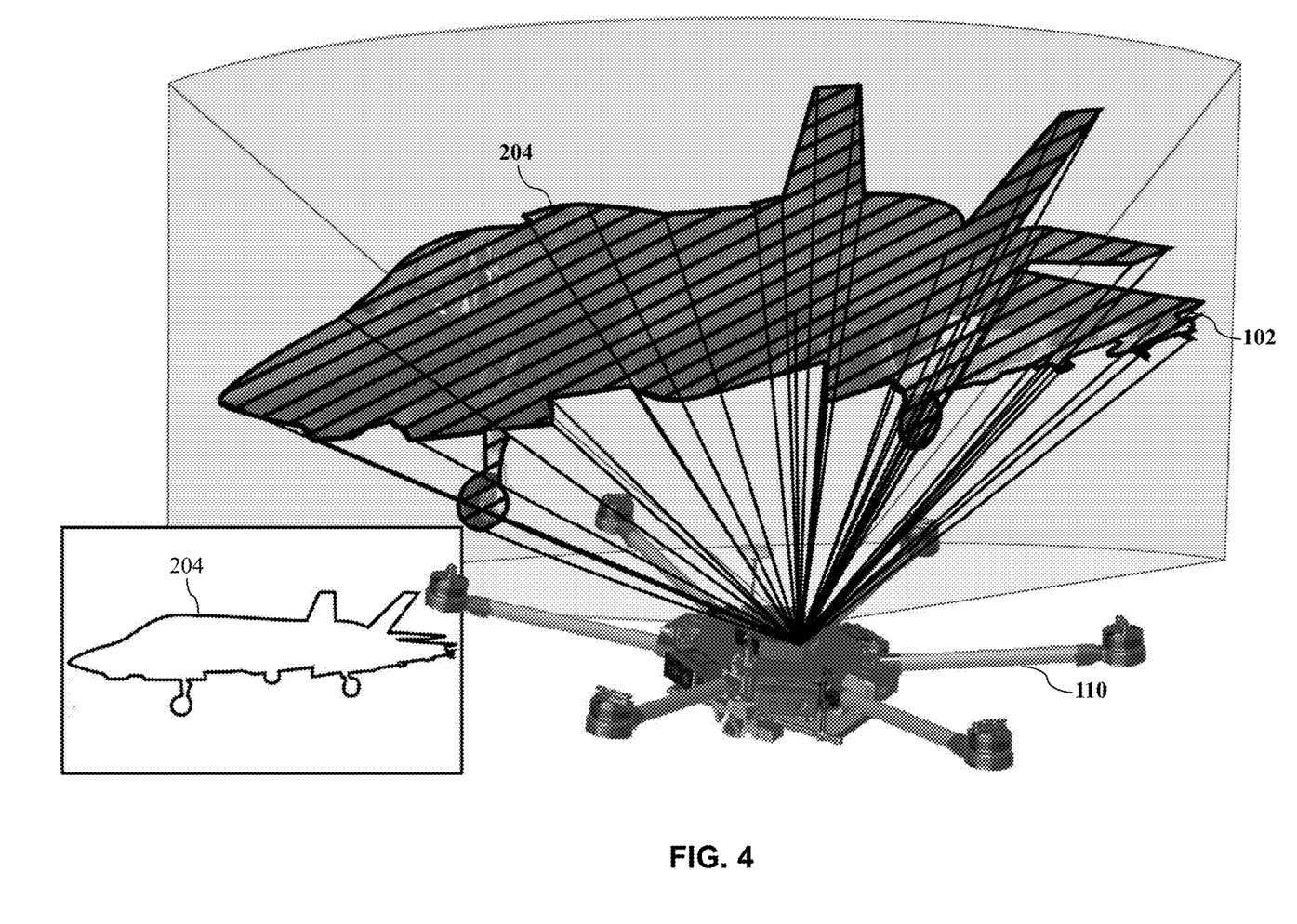
FIG. 4 illustrates object boundary contour detection by a moveable platform illustrated in FIGS. 1a-b in accordance with exemplary embodiments.

The object 102 may be any object of interest being monitored, tracked, and/or targeted by the moveable platform 110. For example, the object may be, but is not limited to, a vehicle (e.g., an air-based vehicle, a sea-based vehicle, a land-based vehicle, a space-based vehicle, etc.), a building, a landmark (e.g., a mountain, a body of water, a canyon, a road, or any other distinctive geographic feature, etc.), a person, a satellite, a planet, etc. In an embodiment the object 102 may be a military jet as illustrated in FIGS. 2-4. The object 102 may be composed of one or more subcomponents 202 such as, but not limited to, vehicle parts (e.g., wheels, doors, windows, etc.), building parts (e.g., windows, doors, roofs, chimneys, etc.), specific features of a landmark (e.g., a peak of a mountain, a bend in a river, etc.), or facial features (e.g., a nose, eyes, mouth, ears, hair, etc.). For example, as illustrated in FIG. 3, a military jet (e.g., the object 102) may be include subcomponents such as, but not limited to, a windscreen, landing gear, wings, and stabilizers, etc.

The moveable platform 110 may be any object or device (military, civilian, consumer, or otherwise) capable of monitoring, tracking, targeting, landing on, and/or attaching to the object 102. The moveable platform 110 is illustrated in more detail in FIG. 1B. The moveable platform 110 can include one or more sensors 112, one or more augmented reality sensors 114, a processor 116, a memory 118, a local storage 120, and a platform location and spatial orientation determination program 130. The moveable platform 110 may be a device capable of moving, for example, on the ground, through the air, or on water, etc. In an exemplary embodiment, as illustrated in FIGS. 2-4, the moveable platform 110 may be an aerial device, such as a drone, which is capable of monitoring, tracking, targeting, landing on, and/or attaching to a military jet (e.g., the object 102).

Figure 1B:
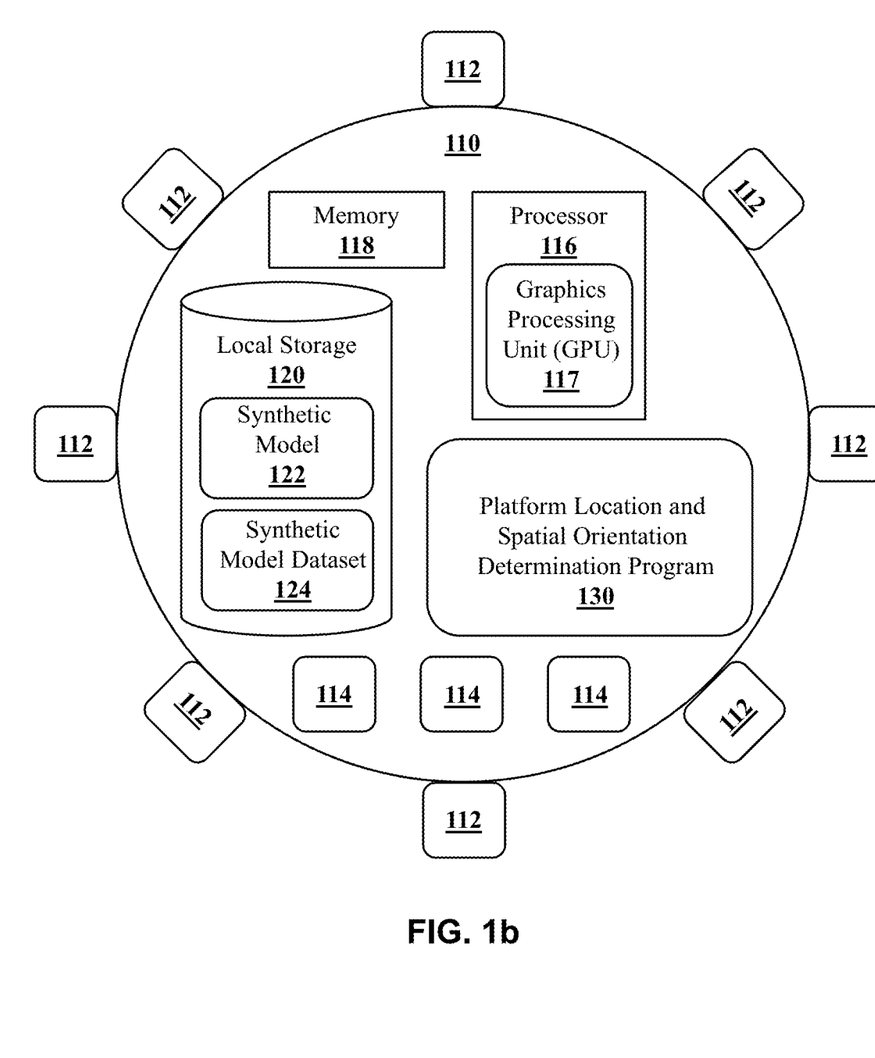
FIG. 1B illustrates an example of a moveable platform of the system illustrated in FIG. 1a in accordance with exemplary embodiments.

The sensors 112 can be cameras or any other optical sensors capable of capturing an image of the object 102 using computer vision object detection techniques and transmitting that image to other computing devices such as, but not limited to, the platform 110 and the computing device 150. The sensors 112 can be, for example, but not limited to, mounted on the moveable platform 110, external to the moveable platform 110, part of the moveable platform 110, fixed to the moveable platform 110, flexibly attached to the moveable platform 110, positioned in a known positional relationship apart from the moveable platform 110, or otherwise directly or indirectly associated to the moveable platform 110. The sensors 112 may be located anywhere on the moveable platform 110 such as, but not limited to, a periphery of the moveable platform 110 as illustrated in FIG. 1B, centrally located on a body of the moveable platform 110, or otherwise directly or indirectly attached to the moveable platform 110. Further, while a plurality of sensors 112 are illustrated in FIGS. 1B-4, it can be appreciated that the moveable platform 110 may include only a single sensor 112. For example, a camera (e.g., a sensor 112) may be centrally located on the moveable platform 110. Also, while the sensors 112 are illustrated as having the same association with the moveable platform 110, it can be appreciated that the sensors 112 may all be associated with the moveable platform 110 in the same manner or in one or more different manners. For example, all the sensors 112 may be mounted on the moveable platform 110 or a first sensor 112 may be mounted on the moveable platform 110 while second and third sensors 112 may be flexibly attached to the moveable platform 110, and fourth and fifth sensors 112 may be a part of the moveable platform 110, etc.

The augmented reality sensors 114 can be any device capable of detecting or measuring a physical property of the moveable platform 110 or the object 102 and records, indicates, and/or responds to it. For example, the augmented reality sensors 114 may be further used to identify anomalies with the object 102 and may support pre- and post-flight object 102 inspection to augment inspections of the object 102. The detailed measurement capability of the augmented reality sensors 114 may support precision measurement of the object 102 and in conjunction with sensors of other on-board modalities (e.g., the sensors 112, the synthetic model 122, and synthetic model dataset 124, etc.) enable the identification of object 102 anomalies relative to synthetic images of the object 102 (e.g., synthetic images of the synthetic model dataset 124 corresponding to the object 102). Anomalies could be used to identify areas of concern for further inspection or support predictive maintenance opportunities. The augmented reality sensors 114 can receive data from and transmit data to other computing devices such as, but not limited to, the moveable platform 110 and the computing device 150. For example, but not limited to, the data detected by the augmented reality sensors 114 may be transmitted to the platform location and spatial orientation determination program 130 for use as input into one or more of the synthetic models 120 and/or for use in determining a confidence score for one or more synthetic model 120 outputs, described in more detail below. In exemplary embodiments, the augmented reality sensors 114 can be, for example, but not limited to, mounted on the moveable platform 110, external to the moveable platform 110, or otherwise directly or indirectly associated to the moveable platform 110. The augmented reality sensors 114 can include at least one of, a plurality of, or a combination of, a global navigation satellite system (GNSS) sensor, an assistive global positioning system (A-GPS) sensor, an accelerometer, a gyroscope, a magnetometer, a compass, a barometer, a radio frequency sensor, a LiDAR, and a laser, etc.

The processor 116 may include a graphics processing unit (GPU) 117. The processor 116 may be a special purpose or general purpose processor device specifically configured to perform the functions discussed herein. The processor 116 unit or device as discussed herein may be a single processor, a plurality of processors, or combinations thereof. Processor devices may have one or more processor "cores." In an exemplary embodiment, the processor 116 is configured to perform the functions associated with the modules 132-139 of the platform location and spatial orientation determination program 130 as discussed below with reference to FIGS. 5a-5b. The GPU 106 may be specially configured to perform the functions of the platform location and spatial orientation determination program 130 discussed herein. For example, in exemplary embodiment, the GPU 106 is configured to run machine learning models such as, but not limited to, the synthetic model 122.

The memory 118 can be a random access memory, read-only memory, or any other known memory configurations. Further, the memory 118 can include one or more additional memories such as the local storage 120 and/or the remote storage 140, etc. The memory 118 and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software (e.g., the platform location and spatial orientation determination program 130) to the moveable platform 110 and/or the computing device 150. Computer programs, e.g., computer control logic, can be stored in the memory 118.

The local storage 120 can include a synthetic model 122 and a synthetic model dataset 124. The local storage 120 can be deployed on one or more nodes, e.g., storage or memory nodes, or one or more processing-capable nodes of the moveable platform 110 capable of storing, compiling, and/or processing data (e.g. the synthetic model 122 and the synthetic model dataset 124) and computer instructions (e.g., from the platform location and spatial orientation determination program 130), and receiving and sending that data to and from other computing devices, such as the remote storage 140, and the computing device 150, etc. For example, the local storage 120 may store the synthetic model 122 and the synthetic model dataset 124, which are discussed in more detail below. The synthetic model 122 and the synthetic model dataset 124 stored in the local storage 120 may correspond to a particular object 102 (e.g. a military jet). While only a single synthetic model 122 and a single synthetic model dataset 124 are illustrated, it can be appreciated that the local storage 120 may store any number of synthetic models 122 and any number of synthetic model datasets 124 corresponding to any number of objects 102. For example, the local storage 120 may store a plurality of different synthetic models 122 for a single object 102 (e.g., a first synthetic model for detecting the object 102, a second synthetic model for detecting subcomponents of the object 102, and a third synthetic model for detecting a boundary of the object 102, etc.) each synthetic model 122 being trained using one or more synthetic model datasets 124 corresponding to the object 102. The synthetic model 122 and the synthetic model dataset 124 stored in the local storage 120 may correspond to the object 102 being monitored, tracked, and/or targeted, etc. by the moveable platform 110. The local storage 120 may continuously synchronize with the remote storage 140 via the platform location and spatial orientation determination program 130 to ensure the synthetic model 122 and the synthetic model dataset 124 stored in the local storage 120 are kept up to date with the latest available versions of the synthetic model 122 and the synthetic model dataset 124 (e.g., new or updated synthetic models 122 and synthetic model datasets 124 corresponding to a previously existing object 102 or new object 102). The local storage 120 can be any suitable storage configuration, such as, but not limited to a relational database, a structured query language (SQL) database, a distributed database, or an object database, etc. Suitable configurations and storage types will be apparent to persons having skill in the relevant art.

The synthetic model 122 can be a trained computer vision algorithm capable of detecting the object 102 and determining the location and spatial orientation of the moveable platform 110 relative to the object 102 based on one or more detectable features of the object 102. As discussed above, while only a single synthetic model 122 is illustrated, it can be appreciated that any number of synthetic models 122 can be stored in the local storage 120. In an exemplary embodiment, the local storage 120 may include a first synthetic model for identifying the object 102, a second synthetic model for detecting subcomponents of the object 102, and a third synthetic model for detecting a boundary of the object 102, etc., each synthetic model then being used to determine a relative coordinate position and spatial orientation of the moveable platform 110. The synthetic model 122 can be trained using the synthetic model dataset 124. The synthetic model dataset 124 may include one or more synthetic images of the object 102 that represent the object 102 in infinitely scalable zoom, pitch, roll, yaw, lighting, and color characteristics. The synthetic images of the object 102 used to train the synthetic model 122 may be generated using the systems and methods disclosed in U.S. patent application Ser. No. 16/992,285 filed on Oct. 5, 2020 titled "System and Method for Generating Synthetic Data," herein incorporated by reference in its entirety. Further, the synthetic images of the synthetic model dataset 124 may include and/or be based on images captured by the sensors 112.

Figure 1C:
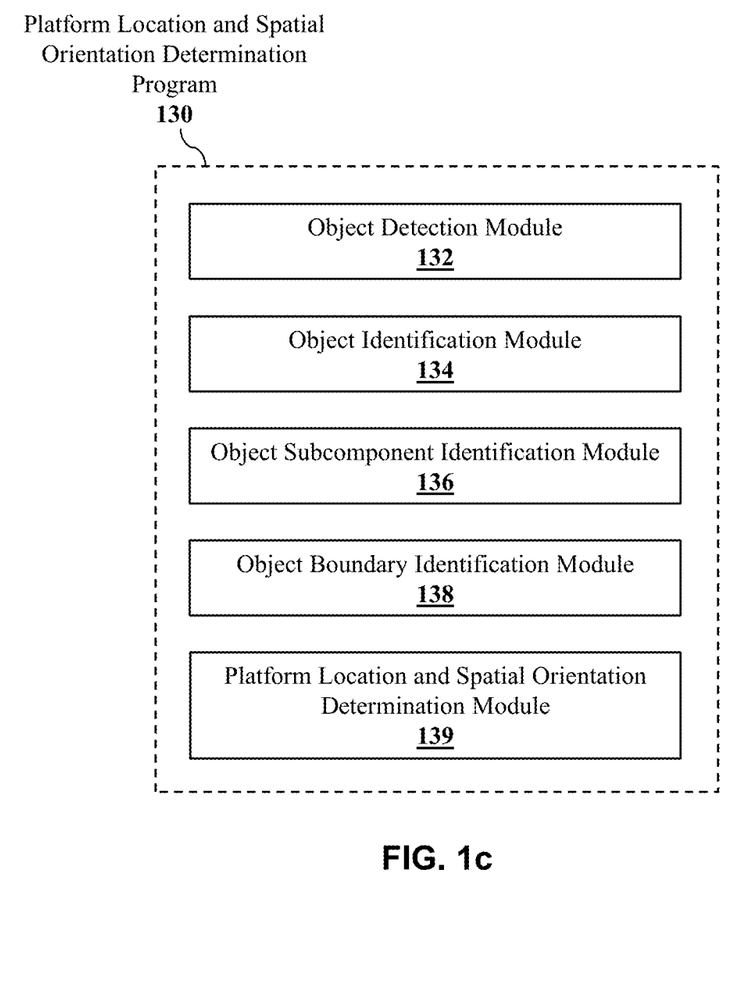
FIG. 1c illustrates example of modules of a platform location and spatial orientation determination program of FIG. 1B in accordance with exemplary embodiments.

The platform location and spatial orientation determination program 130 is a software component that can run the synthetic model 122 using data received from the sensors 112 and the augmented reality sensors 114 to determine a relative coordinate position and spatial orientation of the moveable platform 110. As illustrated in FIG. 1c, the platform location and spatial orientation determination program 130 can include the object detection module 132, the object identification module 134, the object subcomponent identification module 136, the object boundary identification module 138, and the platform location and spatial orientation determination module 139, which are discussed in more detail below with reference to FIGS. 5a-5b.

Referring back to FIG. 1a, the computing device 150 can include a graphical user interface 152 and a display 156. The computing device 150 may be a server computer, desktop computer, notebook, laptop computer, tablet computer, handheld device, smart-phone, thin client, or any other electronic device or computing system capable of storing, compiling, and/or processing data, e.g., data from the location determination program 130, and receiving and sending that data to and from other computing devices, such as the moveable platform 110, the remote storage 140 and the display 156. In an exemplary embodiment, the computing device 150 may receive the platform location and orientation output 154 from the moveable platform 110 via the graphical user interface 152. While a single computing device 150 is illustrated, it can be appreciated that any number of computing devices 150 may be a part of the system 100. Further, while the remote storage 140 is illustrated as being separate from the computing device 150, it can be appreciated that the remote storage 140 may be part of the computing device 150.

The graphical user interface 152 can include components used to receive input from the moveable platform 110, and/or the computing device 150, or to receive information from the platform location and spatial orientation determination program 130 and display the information on the display 156. In an example embodiment, the graphical user interface 152 uses a combination of technologies and devices, such as device drivers, to provide a platform to enable users of the computing device 150 to interact with the platform location and spatial orientation determination program 130. In the example embodiment, the graphical user interface 152 receives input from a physical input device, such as a keyboard, mouse, touchpad, touchscreen, camera, microphone, etc. In an exemplary embodiment, the graphical user interface 152 may display the platform location and orientation output 154 that may include one or more relative coordinate positions and/or spatial orientations of the moveable platform at the one or more relative coordinate positions.

The display 156 can be any display unit such as, but not limited to, an LCD screen, plasma screen, LED screen, DLP screen, CRT screen, etc. capable of receiving display signals and outputting those display signals for viewing by a user of the computing device 150. While the display 156 is illustrated as being a part of the computer device 150, it can be appreciated that the display 156 can be a separate device in the system 100.

The remote storage 140 can include the synthetic model 122 and the synthetic model dataset 124. The remote storage 140 can be deployed on one or more nodes, e.g., storage or memory nodes, or one or more processing-capable nodes such as a server computer, desktop computer, notebook, laptop computer, tablet computer, handheld device, smart-phone, thin client, or any other electronic device or computing system capable of storing, compiling, and/or processing data and computer instructions (e.g., the synthetic model 122, the synthetic model dataset 124, and images of the object 102) and receiving and sending that data to and from other computing devices, such as the moveable platform 110 and the computing device 150. The remote storage 140 is a collection of synthetic models 122 and synthetic model datasets 124 for one or more objects 102. The synthetic models 122 and synthetic model datasets 124 may be updated if necessary and new synthetic models 122 and synthetic model datasets 124 may be added as new objects are synthetically imaged. For example, developers and engineers can create new synthetic images of new objects 102 or object 102 not previously synthetically imaged to create new synthetic model datasets 124 that in turn can be used to train new synthetic models 122 for the new objects 102 or images of objects 102 from new perspectives. The remote storage 140 can be any suitable database configuration, such as a relational database, a structured query language (SQL) database, a distributed database, or an object database, etc. Suitable configurations and storage types will be apparent to persons having skill in the relevant art. In an embodiment, the remote storage 140 may be a cloud-hosted, globally available repository of the synthetic models 122 and the synthetic model datasets 124. The remote storage 140 may provide global access, via the internet or any other suitable network, to a collection of validated synthetic models 122 and the synthetic model datasets 124 that may be updated or added to for a one or more objects 102. While only a single remote storage 140 is illustrated, it can be appreciated that any number of remote storages 140 can exist. For example, but not limited to, there may be a remote storage 140 for each of a plurality of customers, or for a classification of objects 102, etc. While the remote storage 140 is illustrated separately from the computing device 150, it can be appreciated that the remote storage 140 may be a part of another device such as the computing device 150. Further, it can be appreciated that the remote storage 140 and the local storage 120, discussed in more detail above, may be a single storage medium which can be either remote from the moveable platform 110 or deployed locally on the moveable platform 110 or otherwise connected to the moveable platform 110.

Figure 5A:
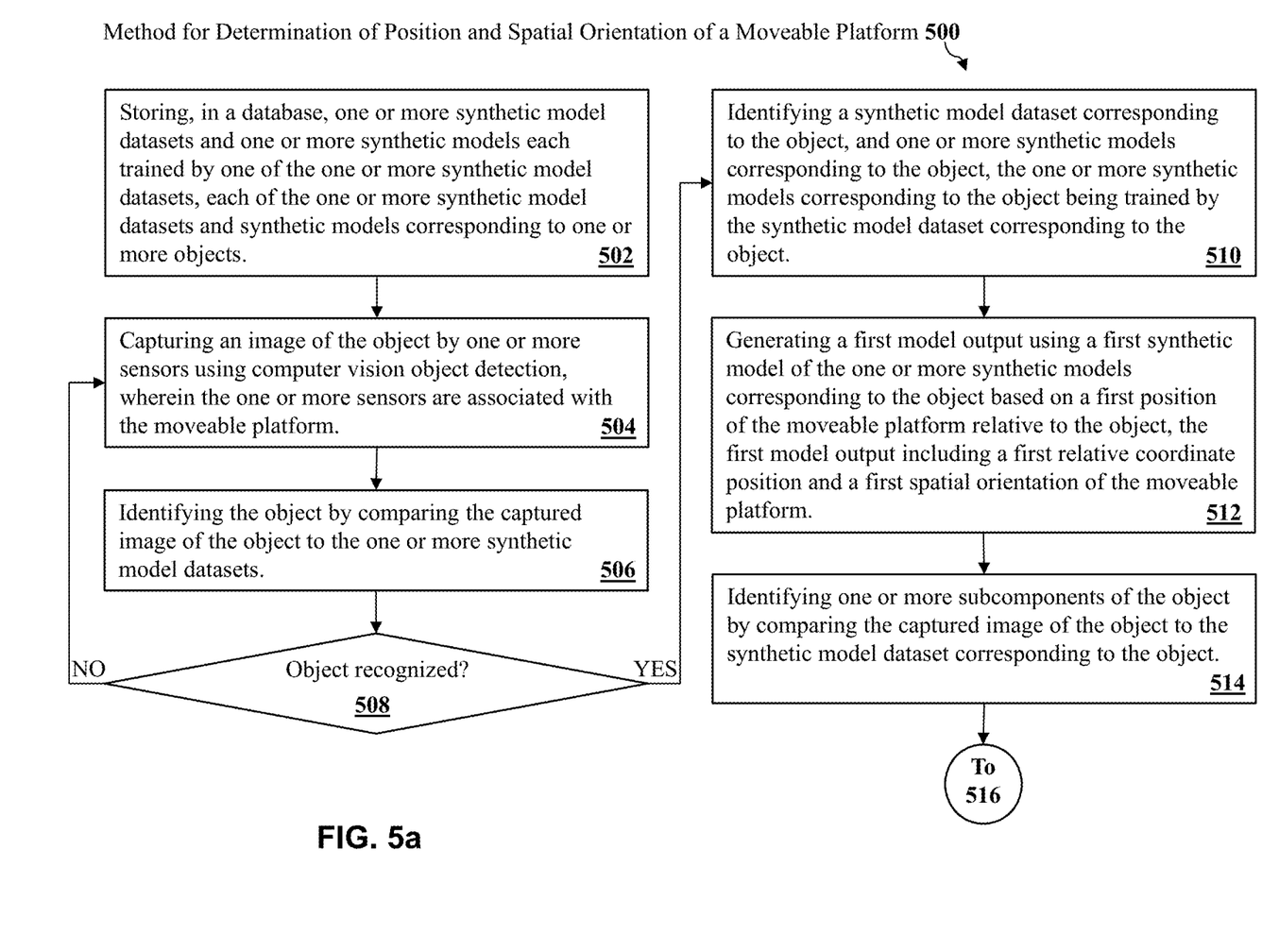
FIGS. 5a and 5b illustrate an exemplary method for determining position of a moveable platform relative to an object of interest in accordance with exemplary embodiments.
Figure 5B:
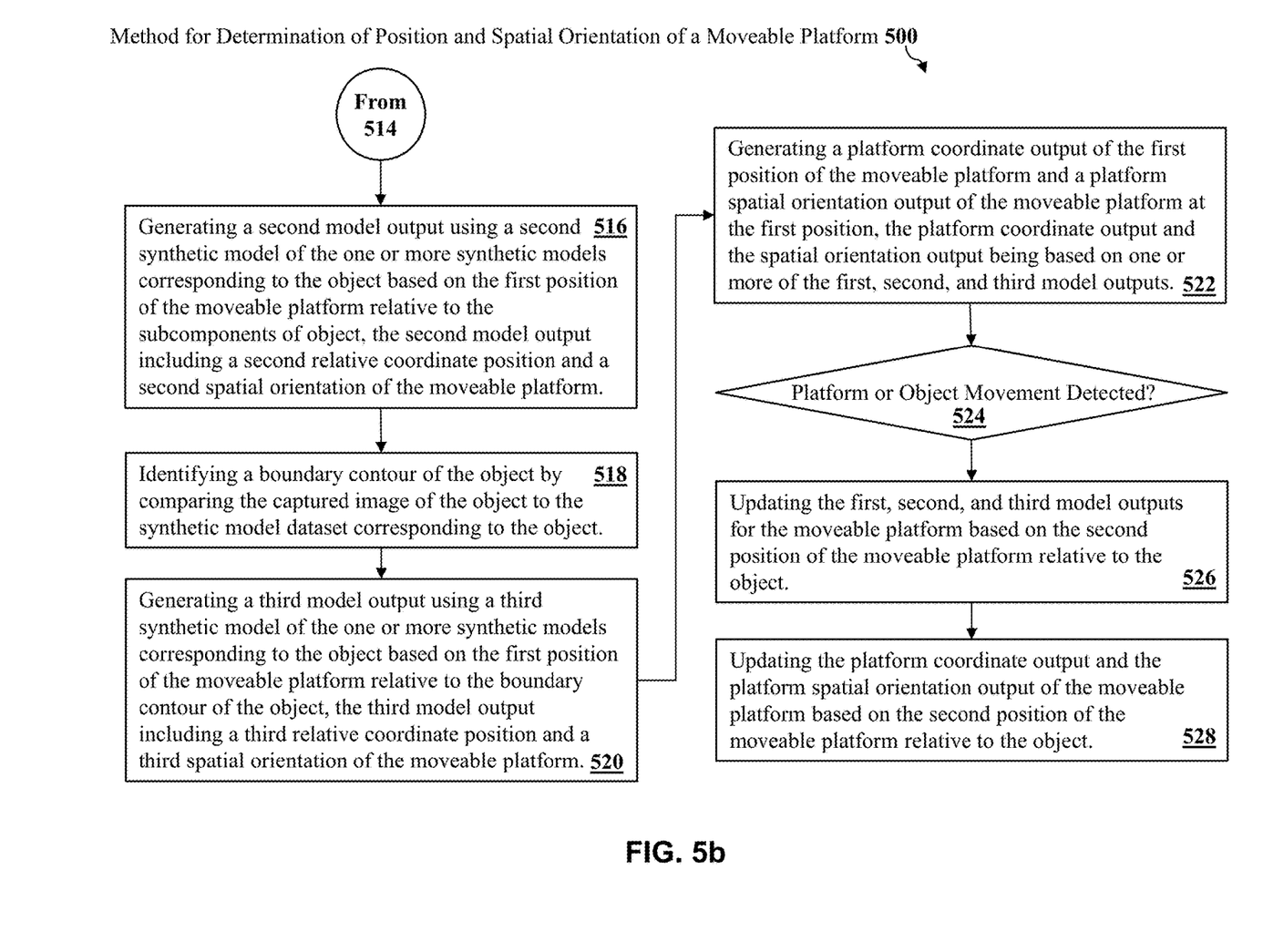

Method for Determination of Position and Spatial Orientation of a Moveable Platform Relative to an Object FIGS. 5a-5b illustrates a flowchart of an exemplary method 500 for determining position of a moveable platform relative to an object in accordance with exemplary embodiments.

In an exemplary embodiment as illustrated in FIG. 5a, the method 500 can include block 502 for storing one or more synthetic model datasets (e.g., the synthetic model dataset 124) and one or more synthetic models (e.g., the synthetic model 122) in a database. For example, the one or more synthetic model datasets 124 and one or more synthetic models 122 may be stored in the remote storage 140 or the local storage 120 on the moveable platform 110. Each of the synthetic models 122 may be trained using one of the one or more synthetic model datasets 124. Further, each of the one or more synthetic model datasets 124 and each of the synthetic models 122 may correspond to one or more objects 102. For example, the synthetic model dataset 124 may include synthetic images of the object 102 that is used to train one or more synthetic models 120 that correspond to the object 102. In an exemplary embodiment, the object 102 may have three corresponding synthetic models 120 trained on the synthetic model dataset 124, described in more detail below.

In an exemplary embodiment, the method 500 can include block 504 for capturing an image of the object 102 by one or more sensors 112 using computer vision object detection. In an exemplary embodiment the sensors 112 may be mounted on the moveable platform 110, external to the moveable platform 110, part of the moveable platform 110, fixed to the moveable platform 110, flexibly attached to the moveable platform 110, positioned in a known positional relationship apart from the moveable platform 110, or otherwise directly or indirectly associated to the moveable platform 110. Further, the sensors 112 may all be associated with the moveable platform 110 in the same manner or one or more different manners. For example, all the sensors 112 may be mounted on the moveable platform 110 or a first sensor 112 may be mounted on the moveable platform 110 while second and third sensors 112 may be flexibly attached to the moveable platform 110, and fourth and fifth sensors 112 may be a part of the moveable platform 110, etc. The one or more sensors 112 may be cameras or any optical sensors of an arbitrary spectrum including non-visible light. In an exemplary embodiment, the object detection module 132 can be configured to execute the method of block 504.

In an exemplary embodiment, the method 500 can include block 506 for identifying the object 102 by comparing the captured image of the object 102 to the one or more synthetic model datasets 124. For example, but not limited to, the object 102 may be a military jet and the captured image of the military jet may be compared to one or more synthetic model datasets 124 to see if the military jet depicted in the image matches a synthetic image of a synthetic model dataset 124. In an exemplary embodiment, the object identification module 134 can be configured to execute the method of block 506. In the event that the object 102 is not identified at step 506, the captured image of the object 102 may be stored in the local storage 120 and/or transmitted to the remote storage 140 for later analysis.

In an exemplary embodiment, the method 500 can include block 508 for determining if the object 102 is a recognized object (e.g., identified). If the object 102 is not recognized, the method 500 may proceed back to block 504 to capture another image of the object 102 to compare to the one or more synthetic model datasets 124. If the object 102 is recognized (e.g., identified), the method 500 may proceed to block 510.

In an exemplary embodiment, the method 500 can include block 510 for identifying a synthetic model dataset 124 corresponding to the object 102, and one or more synthetic models 122 corresponding to the object 102. The one or more synthetic models 122 corresponding to the object 102 may be trained by the synthetic model dataset 124 corresponding to the object 102. In an exemplary embodiment, the object identification module 134 can be configured to execute the method of block 510.

In an exemplary embodiment, the method 500 can include block 512 for generating a first model output using a first synthetic model of the one or more synthetic models 122 corresponding to the object 102 based on a first position of the moveable platform 110 relative to the object 102. The first model output may include a first relative coordinate position and a first spatial orientation of the moveable platform 110. The first spatial orientation may include an angle and a depth in a medium (e.g., water for a sea-based vehicle, air for an air-based vehicle, etc.) of the object 102. Further, in an embodiment, the first relative coordinate position and the first spatial orientation of the moveable platform 110 may be based on a threshold confidence score of the identification of the object 102. For example, the platform location and spatial orientation program 130 may determine a confidence percentage for the identification of the object 102. The confidence score may be based on the level of matching between the captured image of the object 102 and one or more synthetic images of the identified synthetic model dataset 124. In an exemplary embodiment, the object identification module 134 can be configured to execute the method of block 512.

In an exemplary embodiment, the method 500 can include block 514 for identifying one or more subcomponents 202 of the object 102 by comparing the captured image of the object 102 to the synthetic model dataset 124 corresponding to the object 102. In an exemplary embodiment, the object subcomponent identification module 136 can be configured to execute the method of block 514.

In an exemplary embodiment, the method 500 can include block 516 for generating a second model output using a second synthetic model of the one or more synthetic models 122 corresponding to the object 102 based on the first position of the moveable platform 110 relative to the subcomponents 202 of the object 102. The second model output may include a second relative coordinate position and a second spatial orientation of the moveable platform 110. Further, in an embodiment, the second relative coordinate position and the second spatial orientation of the moveable platform 110 may be based on a threshold confidence score of the identification of the subcomponents 202 of the object 102. For example, the platform location and spatial orientation program 130 may determine a confidence percentage for the one or more identified subcomponents 202 of the object 102. The confidence score may be based on the level of matching between the identified subcomponents 202 in the captured image of the object 102 and one or more synthetic images of the identified synthetic model dataset 124. For example, the object 102 may have five possible identifiable subcomponents 202 and if the platform location and spatial orientation program 130 only identifies one subcomponent 202, the confidence score of the subcomponent identification may be low. Further, the confidence score may be based on a level of matching between features (e.g., shape, color, position, etc.) of the identified subcomponent(s) 202 of the object 102 and features of those subcomponent(s) 202 in the synthetic model dataset 124.

In an exemplary embodiment, the method 500 can include block 518 for identifying a boundary contour 204 of the object 102 by comparing the captured image of the object 102 to the synthetic model dataset 124 corresponding to the object 102. The boundary contour 204 is an outline of the entire object 102. For example, as illustrated in FIG. 4, the boundary contour 204 may be the outline of a military jet (e.g., the object 102) based on the captured image of the object 102. In an exemplary embodiment, the object boundary identification module 138 can be configured to execute the method of block 518.

In an exemplary embodiment, the method 500 can include block 520 for generating a third model output using a third synthetic model of the one or more synthetic models 122 corresponding to the object 102 based on the first position of the moveable platform 110 relative to the boundary contour 204 of the object 102. The third model output may include a third relative coordinate position and a third spatial orientation of the moveable platform 110.

Further, in an embodiment, the third relative coordinate position and the third spatial orientation of the moveable platform 110 may be based on a threshold confidence score of the identification of the boundary contour 204 of the object 102. For example, the platform location and spatial orientation program 130 may determine a confidence percentage for the boundary contour 204 of the object 102. The confidence score may be based on the level of matching between the boundary contour 204 identified in the captured image of the object 102 and one or more synthetic images of the identified synthetic model dataset 124. For example, the boundary contour 204 identified in the captured image of the object 102 will depend on the spatial relationship between the one or more sensors 112 of the moveable platform 110 and the object 102 and/or the presence of anything obscuring the view between the moveable platform 110 and the object 102 (e.g., clouds, animals, another object, etc.). Therefore, one or more features of the boundary contour 204 of the object 102 may not be visible in the boundary contour 204 identified by the platform location and spatial orientation program 130. Thus, the confidence score may depend on the robustness of the synthetic model dataset 124 (e.g., how many views of the object 102 are represented in the synthetic model dataset 124). For example, the captured image of the object 102 may be a head on view of the object 102 and thus any features of the side profiles or rear profile of the object 102 will not be visible. However, in exemplary embodiments, the synthetic image dataset 124 contains thousands of synthetic images of the object 102 to provide an infinitely scalable depiction of the object 102; thus, the platform location and spatial orientation determination program 130 is likely to be able to identify the boundary contour 204 of the object 102 with high confidence. In an exemplary embodiment, the object boundary identification module 138 can be configured to execute the method of block 520.

In an exemplary embodiment, the method 500 can include block 522 for generating a platform coordinate output of the first position of the moveable platform 110 and a platform spatial orientation output of the moveable platform 110 at the first position. The platform coordinate output and the spatial orientation output may be based on one or more of the first, second, and third model outputs. The platform coordinate output of the first position of the moveable platform 110 may be a weighted output using machine learning based on at least two of the first, second, and third relative coordinates of the moveable platform 110. The platform spatial orientation output of the moveable platform 110 may be a weighted output using machine learning based on at least two of the first, second, and third spatial orientations of the moveable platform 110. In an exemplary embodiment, the platform location and spatial orientation determination module 139 can be configured to execute the method of block 522.

In an exemplary embodiment, the method 500 can include block 524 for detecting a movement of the moveable platform 110 from the first position to a second position and/or a movement of the object 102 relative to the moveable platform 110 (e.g., the actual position of the moveable platform 110 is the same, but the relative position of the moveable platform to the object 102 would differ from the first position). For example, one of or both of the object 102 and the moveable platform 110 may be in motion. If a movement of the object 102 and/or the moveable platform 110 is detected, the method 500 may proceed to block 526.

In an exemplary embodiment, the method 500 can include block 526 for updating the first, second, and third model outputs for the moveable platform 110 based on the second position of the moveable platform 110 relative to the object 102. Further, the first, second, and third model outputs for the moveable platform 110 may be continuously updated based on a continuous movement of the moveable platform 110 from a position to another position. For example, the moveable platform 110 may be in constant motion (e.g., driving, flying, or sailing, etc.) and therefore the moveable platform 110 may be constantly changing position. Further, the object 102 may also be in motion (e.g., driving, flying, or sailing, etc.) therefore the object 102 may be constantly changing position. In exemplary embodiments, one or both of the object 102 and the moveable platform 110 may be in motion and/or stationary. In an exemplary embodiment, the platform location and spatial orientation determination module 139 can be configured to execute the method of block 526.

In an exemplary embodiment, the method 500 can include block 528 for updating the platform coordinate output and the platform spatial orientation output of the moveable platform 110 based on the second position of the moveable platform 110 relative to the object 102. In an exemplary embodiment, the platform location and spatial orientation determination module 139 can be configured to execute the method of block 528.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged and some operations can be made optional without departing from the spirit of the disclosed subject matter.

A system, as used herein, can be in combination with one or more nodes, wherein the system resides in the one or more nodes. A node can be configured to interface or contain one or more components of the systems described herein.

A hardware processor, as used herein, can be a special purpose or general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A method for determining the position of a moveable platform relative to an object, the method comprising:
    storing, in a database, one or more synthetic model datasets and one or more synthetic models each trained by one of the one or more synthetic model datasets, each of the one or more synthetic model datasets and synthetic models corresponding to one or more objects;
    capturing an image of the object by one or more sensors using computer vision object detection, wherein the one or more sensors are associated with the moveable platform;
    identifying the object by comparing the captured image of the object to the one or more synthetic model datasets;
    identifying a synthetic model dataset corresponding to the object, and one or more synthetic models corresponding to the object, the one or more synthetic models corresponding to the object being trained by the synthetic model dataset corresponding to the object;
    generating a first model output using a first synthetic model of the one or more synthetic models corresponding to the object based on a first position of the moveable platform relative to the object, the first model output including a first relative coordinate position and a first spatial orientation of the moveable platform; and
    generating a platform coordinate output of the first position of the moveable platform and a platform spatial orientation output of the moveable platform at the first position, the platform coordinate output and the spatial orientation output being based on the first model output.

2. A method as in claim 1, comprising:
    identifying one or more subcomponents of the object by comparing the captured image of the object to the synthetic model dataset corresponding to the object;
    generating a second model output using a second synthetic model of the one or more synthetic models corresponding to the object based on the first position of the moveable platform relative to the subcomponents of object, the second model output including a second relative coordinate position and a second spatial orientation of the moveable platform; and
    wherein the generating the platform coordinate output of the first position of the moveable platform and the platform spatial orientation output of the moveable platform at the first position is based on one or more of the first model output and the second model output.

3. A method as in claim 2, wherein the synthetic model dataset of the object includes synthetic images of the object and subcomponents of the object, the synthetic images providing scalable characteristics of the object and subcomponents of the object, the characteristics including one or more of: pitch, roll, yaw, lighting, and colors.

4. A method as in claim 2, comprising:
    identifying a boundary contour of the object by comparing the captured image of the object to the synthetic model dataset corresponding to the object;
    generating a third model output using a third synthetic model of the one or more synthetic models corresponding to the object based on the first position of the moveable platform relative to the boundary contour of the object, the third model output including a third relative coordinate position and a third spatial orientation of the moveable platform; and
    wherein the generating the platform coordinate output of the first position of the moveable platform and the platform spatial orientation output of the moveable platform at the first position is based on one or more of the first model output, the second model output, and the third model output.

5. A method as in claim 4, comprising:
    detecting a movement of the moveable platform from the first position to a second position;
    updating one or more of the first, second, and third model outputs for the moveable platform based on the second position of the moveable platform relative to the object; and updating the platform coordinate output and the platform spatial orientation output of the moveable platform based on the second position of the moveable platform relative to the object.

6. A method as in claim 5, wherein one or more of the first, second, and third model outputs are continuously updated based on a continuous movement of the moveable platform from a position to another position.

7. A method as in claim 4, wherein the platform coordinate output of the first position of the moveable platform is a weighted output using machine learning based on at least two of the first, second, and third relative coordinates of the moveable platform and the platform spatial orientation output of the moveable platform is a weighted output using machine learning based on at least two of the first, second, and third spatial orientations of the moveable platform.

8. A method as in claim 4, wherein the spatial orientation of the first, second, and third model outputs includes an angle and a depth of the object.

9. A method as in claim 4, wherein the relative coordinates of the first, second, and third model outputs are based on a threshold confidence percentage determined by the first, second, and third synthetic models.

10. A method as in claim 1, wherein the one or more sensors are at least one of optical sensors of an arbitrary spectrum including visible or non-visible light.

11. A method as in claim 1, wherein the moveable platform is selected from the group consisting of: an air-based vehicle or object, a sea-based vehicle or object, a land-based vehicle or object, and a space-based vehicle or object.

12. A method as in claim 1, wherein the sensors include one or more augmented reality sensors selected from the group consisting of: a global navigation satellite system (GNSS), an assistive global positioning system (A-GPS), an accelerometer, a gyroscope, a magnetometer, a compass, a barometer, a radio frequency device, a LiDAR, and a laser.

13. A method as in claim 1, wherein at least one of the moveable platform or the object is in motion.

14. A method as in claim 1, wherein the moveable platform performs a task based on the platform coordinate output of the first position of the moveable platform and the platform spatial orientation output of the moveable platform at the first position, the task being selected from the group consisting of: attaching to the object, landing on the object, targeting the object, tracking the object, maintaining a spatial relationship to the object, and avoiding the object.

15. A method as in claim 1, wherein each of the one or more sensors are associated with the platform in the same manner or the one or more sensors are associated with the platform in one or more different manners.

16. A method as in claim 1, wherein the one or more sensors are associated with the platform by at least one of: being part of the moveable platform, fixed to the moveable platform, flexibly attached to the moveable platform, positioned in a known positional relationship apart from the moveable platform position.

17. A system for determining the position of a moveable platform relative to an object, the system comprising:
a database configured to store one or more synthetic model datasets and one or more synthetic models each trained by the one or more synthetic model datasets, each of the one or more synthetic model datasets and synthetic models corresponding to one or more objects;
the moveable platform, the moveable platform including one or more sensors associated to the moveable platform, the one or more sensors configured to:
capture an image of the object by one or more sensors using computer vision object detection, wherein the one or more sensors are associated with the moveable platform; and
a processor configured to:
identify the object by comparing the captured image of the object to the one or more synthetic model datasets;
identify a synthetic model dataset corresponding to the object, and one or more synthetic models corresponding to the object, the one or more synthetic models corresponding to the object being trained by the synthetic model dataset corresponding to the object;
generate a first model output using a first synthetic model of the one or more synthetic models corresponding to the object based on a first position of the moveable platform relative to the object, the first model output including a first relative coordinate position and a first spatial orientation of the moveable platform;
generate a platform coordinate output of the first position of the moveable platform and a platform spatial orientation output of the moveable platform at the first position, the platform coordinate output and the spatial orientation output being based on the first model output.

18. A system as in claim 17, comprising:
the processor is configured to:
identify one or more subcomponents of the object by comparing the captured image of the object to the synthetic model dataset corresponding to the object;
generate a second model output using a second synthetic model of the one or more synthetic models corresponding to the object based on the first position of the moveable platform relative to the subcomponents of object, the second model output including a second relative coordinate position and a second spatial orientation of the moveable platform; and
wherein the platform coordinate output and the spatial orientation output are based on one or more of the first model output and the second model output.

19. A system as in claim 18, wherein the synthetic model dataset of the object includes synthetic images of the object and subcomponents of the object, the synthetic images providing scalable characteristics of the object and subcomponents of the object, the characteristics including one or more of: pitch, roll, yaw, lighting, and colors.

20. A system as in claim 18 comprising:
the processor is configured to:
identify a boundary contour of the object by comparing the captured image of the object to the synthetic model dataset corresponding to the object;
generate a third model output using a third synthetic model of the one or more synthetic models corresponding to the object based on the first position of the moveable platform relative to the boundary contour of the object, the third model output including a third relative coordinate position and a third spatial orientation of the moveable platform; and wherein the platform coordinate output and the spatial orientation output are based on one or more of the first model output, the second model output, and the third model output.

21. A system as in claim 20, comprising:
the one or more sensors configured to:
    detect a movement of the moveable platform from the first position to a second position; and
the processor configured to:
    update one or more of the first, second, and third model outputs for the moveable platform based on the second position of the moveable platform relative to the object;
    update the platform coordinate output and the platform spatial orientation output of the moveable platform based on the second position of the moveable platform relative to the object.

22. A system as in claim 21, wherein one or more of the first, second, and third model outputs are updated over time based on a movement of the moveable platform from a position to another position.

23. A system as in claim 20, wherein the platform coordinate output of the first position of the moveable platform is a weighted output using machine learning based on at least two of the first, second, and third relative coordinates of the moveable platform and the platform spatial orientation output of the moveable platform is a weighted output using machine learning based on at least two of the first, second, and third spatial orientations of the moveable platform.

24. A system as in claim 20, wherein the spatial orientation of the first, second, and third model outputs includes an angle and a depth of the object.

25. A system as in claim 20, wherein the relative coordinates of the first, second, and third model outputs are based on a threshold confidence percentage determined by the first, second, and third synthetic models.

26. A system as in claim 17, wherein the one or more sensors are at least one of optical sensors of an arbitrary spectrum including visible or non-visible light.

27. A method as in claim 17, wherein the moveable platform is selected from the group consisting of: an air-based vehicle or object, a sea-based vehicle or object, a land-based vehicle or object, and a space-based vehicle or object.

28. A system as in claim 17, wherein the sensors include one or more augmented reality sensors selected from the group consisting of: a global navigation satellite system (GNSS), an assistive global positioning system (A-GPS), an accelerometer, a gyroscope, a magnetometer, a compass, a barometer, a radio frequency device, a LiDAR, and a laser.

29. A system as in claim 17, wherein at least one of the moveable platform or the object is in motion.

30. A system as in claim 17, wherein the moveable platform performs a task based on the platform coordinate output of the first position of the moveable platform and the platform spatial orientation output of the moveable platform at the first position, the task being selected from the group consisting of: attaching to the object, landing on the object, targeting the object, tracking the object, maintaining a spatial relationship to the object, and avoiding the object.

31. A system as in claim 17, wherein each of the one or more sensors are associated with the platform in the same manner or the one or more sensors are associated with the platform in one or more different manners.

32. A system as in claim 17, wherein the one or more sensors are associated with the platform by at least one of: being part of the moveable platform, fixed to the moveable platform, flexibly attached to the moveable platform, positioned in a known positional relationship apart from the moveable platform position.

* * * * *